United States Patent [19]
Colbrese

[11] Patent Number: 4,507,720
[45] Date of Patent: Mar. 26, 1985

[54] AUTOMOTIVE/HOME POWER INTERCONNECTION SYSTEM

[75] Inventor: Nick P. Colbrese, Homewood, Ill.

[73] Assignee: Safe-T-Plug, Inc., Simi Valley, Calif.

[21] Appl. No.: 400,291

[22] Filed: Jul. 26, 1982

[51] Int. Cl.³ .............................................. H02M 7/00
[52] U.S. Cl. ......................................... 363/13; 307/9; 307/67; 307/68
[58] Field of Search ................... 307/9, 10 R, 67, 68; 363/13, 102, 105, 135, 146

[56] References Cited

U.S. PATENT DOCUMENTS

| | | | |
|---|---|---|---|
| 3,243,598 | 3/1966 | Grillo | 307/68 |
| 3,665,502 | 5/1972 | Means | 363/102 |
| 3,894,242 | 7/1975 | Helling | 307/10 R |
| 3,919,622 | 11/1975 | Al Nema et al. | 363/135 |
| 4,157,492 | 6/1979 | Colbrese | 307/10 R |

Primary Examiner—William M. Shoop
Assistant Examiner—Anita M. Ault
Attorney, Agent, or Firm—Dick and Harris

[57] ABSTRACT

A system for conveniently and safely accessing and utilizing the electrical system of a vehicle to provide suitable electrical power output for emergency use with conventional appliances and lighting fixtures, by electrifying the existing parallel distribution wiring system of a home or otherwise. Said system may further access and utilize the electrical system of a vehicle to provide suitable electric power for remote or mobile use, and is amenable to automotive, marine, aircraft, industrial or stationary use.

8 Claims, 3 Drawing Figures

AUTOMOTIVE/HOME POWER INTERCONNECTION SYSTEM

BACKGROUND OF THE INVENTION

The present invention relates in general to power access and conversion systems, and in particular to an interconnection system for deriving and delivering 110 volt alternating current from the 12 volt direct current electrical system of an automobile for emergency electrification of the home parallel power distribution system.

Many homes today rely extensively upon an uninterrupted supply of electricity from the utility power grid in order to maintain many indispensible functions of modern life. For example, electric sump pumps are often required to prevent flooding or foundation erosion, particularly during heavy rainstorms. Further, many homes utilize gas, oil or other types of forced air or circulated hot water heating systems. Although the requisite combustible material may be available to such furnaces during a power outage, electricity is still needed to run the various fan motors, pumps and electrical relays which are necessary for such heating systems to operate. Finally, homes rely extensively upon electricity for necessary lighting at night, and for the operation of certain radio equipment which may be needed in the event of an emergency.

Although modern utility distribution systems are generally reliable, power outages are common occurrences. Such outages often result from damage related to storms, including frequent interruptions due to heavy ice and snow storms during the winter months, or due to lightning during heavy rain storms. It is at these times, however, that it is most important for homes to maintain the pumping, heating and other functions required for normal living. Therefore, it is highly desirable to have available at the home a system for conveniently and safely supplying electrical current to such modern devices.

In addition, many of the conveniences of modern life likewise rely upon the availability of a standard electrical power supply. For example, many hand tools which facilitate work are electrically operated. Therefore, it is further desirable to have available a system to permit the remote or mobile operation of such electrical equipment where electricity may not otherwise be available.

In order to provide maximum flexibility and utility of such a system, it is desirable for the system to be conveniently, safely and readily connected to the source electrical system or automobile, for it is anticipated that such connections may typically be required under adverse conditions as described. Further, because large currents may be involved in the operation of such a system, it is desirable for the connecting system to minimize the associated dangers of short circuits and incorrect voltage polarity of connection.

Accordingly, it is an object of the present invention:

to provide a system for supplying standard 110 volt alternating current from a battery electrical system, such as the 12 volt direct current system of an automobile;

to permit the easy, rapid and safe connection of such a system to an automobile's electrical system, such as by utilizing convenient battery access systems;

to provide electrical isolation between the two electrical systems;

to provide a method of connecting said power supply to the existing parallel power distribution wiring system within a home to supply electricity to the requisite appliances and lighting devices most readily;

to provide means to safely limit the current passing into and through such external wiring systems in order to protect the home wiring system and to protect the converter system itself;

to provide a system amenable to portable use for supplying standard electric power at remote sights where utility distribution systems are not available, such as construction or camp sites;

to provide such functions and benefits at a minimum cost and in a convenient form and package; and to provide for the safe connection of an automobile's electrical system to a suitable electrical power converter, and for the safe connection of said converter to an external load such as the home distribution wiring system, while protecting against short circuits, faulty connections or improper voltage polarities, even under adverse conditions.

These and other objects of the invention shall be apparent in light of the present specification.

SUMMARY OF THE INVENTION

The present invention comprises a system for accessing the electrical system of a vehicle, for converting the electrical power from the vehicle's electrical system into a second electrical output of differing electrical characteristics, and for supplying the resulting electrical power to external devices and systems.

The system includes an electrical converter for converting the electrical output of the vehicle or other source into a second electrical output with different electrical characteristics. This converter receives its input power from the automobile or other source by means of an appropriate battery access connection device. In the preferred embodiment, this battery access device consists of a male plug and female connecting adapter which cooperate with existing battery access systems utilizing similar male plugs, thereby providing quick, convenient and safe plugwise connection of the converter to an automobile equipped with such access equipment.

The second electrical output of the converter is made accessable to external devices by means of an output connector attached to the converter by appropriate electrical cables.

Because of the differing electrical requirements of certain types of apparatus, the present system is amenable to use with various configurations and types of converters. In one embodiment, the converter consists of a relaxation oscillator wherein a silicon controlled rectifier is repetitively triggered by the output of a unijunction transistor relaxation oscillator to create a substantially square wave output of a specific frequency from the direct current supply. This square wave output may then be applied to a conventional electrical transformer and converted to an oscillating output of differing voltage, such as standard 110 volt peak to peak, 60 Hertz electrical power. This resulting power may then be utilized to energize certain conventional home appliances and equipment.

Another embodiment of the converter consists of an electrical generating apparatus which is designed to convert a rotational mechanical input into a resulting electrical output, and an electrical motor coupled to the input of the generating device whereby the motor supplies the requisite rotational mechanical energy. The motor is supplied with current from the automotive electrical supply, and the output of the generating means is utilized to energize the desired external equipment. In a preferred embodiment of this converter, the electric motor is a direct current shunt motor which advantageously operates at a substantially constant speed, and the generating apparatus consists of an alternating current output alternator. By appropriate selection of motor drive speed parameters and alternator design, a system results which, when driven by 12 volt direct current such as supplied from an automobile's electrical system, produces output current of approximately 110 volts at approximately 60 Hertz. It is anticipated, however, that other motors and alternator configurations may be utilized to operate from other supply voltages and to output other electrical power having differing electrical characteristics, such as the 220 volt 50 Hertz which is common to certain European utility systems.

The present invention may be used to supply mobile power at remote sites, or specifically as an emergency system for operating certain equipment in the home during periods of utility power outage. In relation to remote use, the output of the converter may in one embodiment be connected to the standard female outlet socket of a type commonly used for temporary plugwise connection of appliances. Such a system, however, cannot easily be utilized to energize furnace blower motors, sump pumps, or other mechanical or lighting equipment in the home which are permanently wired to the home parallel power distribution wiring system. Therefore, the present invention further includes output connection devices for permitting the system as described to energize the home power distribution wiring, and to thereby supply electrical power directly to such appliances or equipment.

The distribution wiring system of a home or of other structures is typically a parallel distribution system wherein all loads and available outlets are connected in parallel to the main utility supply. The specific connection to the utility supply is generally accomplished by means of protective fuses or circuit breakers, and additionally often includes means for disconnecting the home distribution system from the utility supply altogether, such as entry box switches.

Because the distribution system is of a parallel nature, it is possible to energize the entire distribution grid from any available outlet similarly connected in a parallel fashion. In one embodiment of the present invention, the output of the converter is applied to a standard male plug designed to cooperate with the typical home wall outlet, whereby the male plug when inserted into the existing outlet supplies energy to the entire parallel wiring system. Of course, it is anticipated that care be taken when using such a system to prevent accidental contact with the exposed prongs of the male output plug. Specifically, it is recommended that the plug be inserted into the home outlet prior to the energization of the converter. For this purpose, one embodiment of the converter includes a switch for controlling the input current to the converter, whereby the converter and therefore the home wiring system may be energized after such connection has been made.

A second embodiment of the converter output connector utilizes a specialized plug connected to the output of the converter which is designed to substantially encase and insulate the electrical contacts. A cooperating socket similarly designed to minimize access to the electrical contacts is included, and is wired in parallel fashion into the house distribution wiring system in a manner similar to the installation of a standard wall outlet. In this manner, output power from the generator may be safely connected to the parallel house wiring system.

In order to provide further safety during the operation of the system, it is desirable to limit the current which is supplied to the house connecting socket to a value less than or equal to the maximum current which the existing house wiring attached to the socket may safely carry. Therefore, the preferred embodiment further includes a fuse or circuit breaker in series with the output of the converter between the converter output and the connection plug.

The preferred method of utilizing the system as described during periods of power outage consists of first disconnecting the home distribution wiring system from the power utility by means of the aforedescribed entrance box switch. In this manner, the home wiring system may be energized without thereby energizing portions of the utility power grid external to the home.

Because of the limited current which may be supplied by the converter and which may be conducted by the existing home wiring, it is desirable to remove from the home system all unnecessary loads. In this regard, unnecessary refrigeration, air conditioning, entertainment and lighting equipment should be unplugged or turned off, thereby assuring that the full converter output will be available to the desired emergency equipment. The connection plug of the system should then be connected to the home via the home connection socket, and the system then energized. Of course, there exist other methods of advantageously utilizing the system herein described.

DETAILED DESCRIPTION OF THE DRAWINGS

Figure 1:
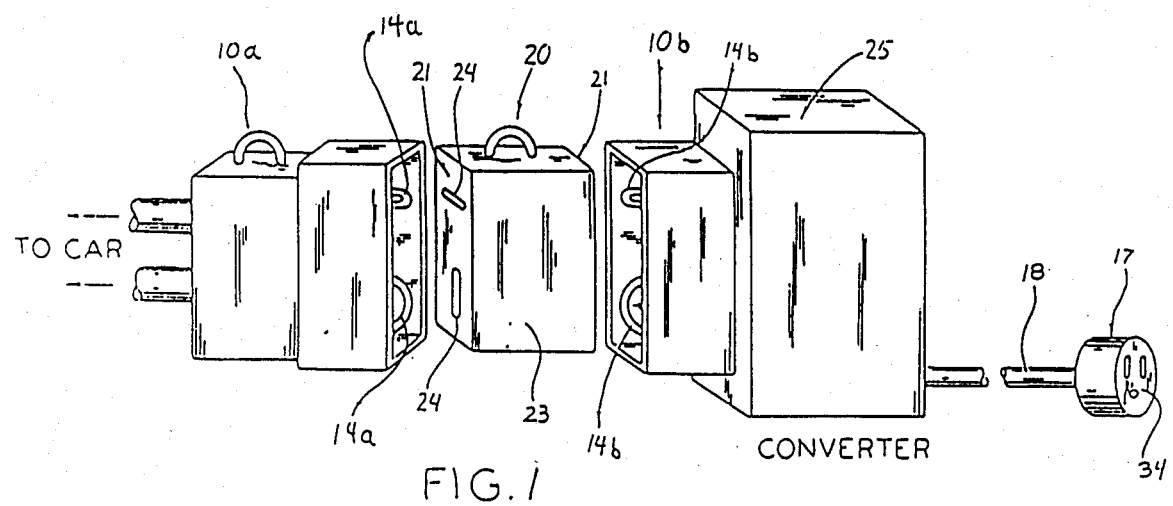
FIG. 1 of the drawings is an exploded elevational view illustrating the basic components of the system and their respective relationship.

While this invention is susceptible of embodiment in many different forms, there is shown in the drawings and will herein be described in detail, several specific embodiments, with the understanding that the present disclosure is to be considered as an exemplification of the principles of the invention and is not intended to limit the invention to the embodiments illustrated.

Figure 2:
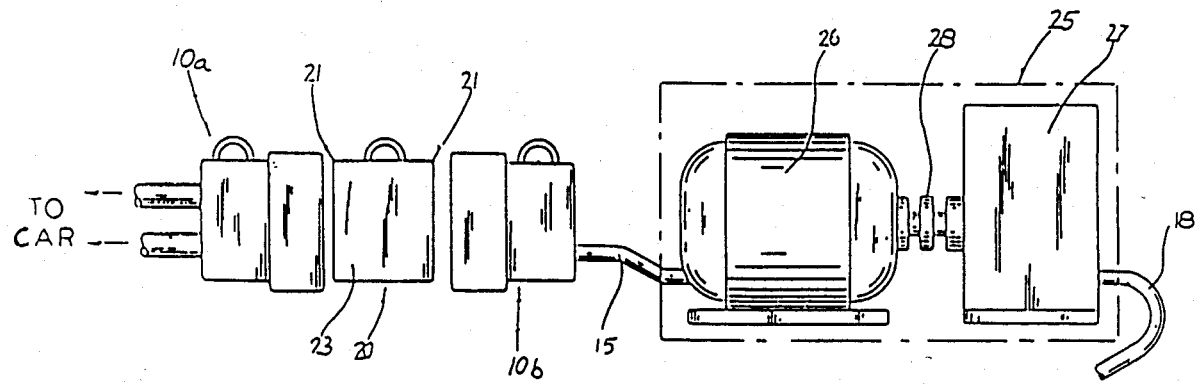
FIG. 2 of the drawings is a side elevational view of one embodiment of the system including a converter means comprising an electric motor coupled to an electric generating means, and further illustrating alternative output connection apparatus.

A representative embodiment of the present invention is illustrated in FIG. 1, and 2 second embodiment is further illustrated in FIG. 2. In each, a converter means 25 is provided for converting a first electrical output of a given source into a second electrical output with differing electrical characteristics. The first electrical output is supplied to the converter by an insulated electric cable 15 which is connected at its first end to the battery access connection device, and which is connected at its second end to the converter 25. The battery access connection device comprises a first male plug connection means 10a including a multiplicity of male electrically conducting prongs 14a which are geometrically oriented and polarized for permitting connection of the male plug connection means 10a to a cooperating female plug connection means 21 in a single geometrical and electrical orientation only.

More generally, the male plug connection means 10 may be of any type suitable for cooperation with existing battery access safety system apparatus designed to permit the safe and convenient connection of such electrical equipment to electrical power sources, particularly to automotive electrical systems. In this regard, a second male plug connection means 10b is shown having an equivalent multiplicity of male electrically conducting prongs 14b for equivalent aligned connection of second male plug connection means 10b to female connection means 21, to, in turn, permit facilitated and expedited electrical connection of the converting apparatus to the automotive electrical system. Further, a connecting adapter 20 is shown which includes a multiplicity of female plug connection means 21 with a multiplicity of female electrically conducting sockets recessed within apertures 24 passing into the unitized body 23 of the connecting adapter 20, said female plug connection means 21 being designed to cooperate with both male plug connection means 10a and b. The connecting adapter 20 thereby permits the electrical connection of a multiplicity of such male plug connection means 10a and b.

Output insulated electric cable 18 containing a multiplicity of electrical conductors is connected at its first end to the output of the converter means 25, and is further connected at its second end to output connection means 17. Output connection means 17 is designed for connecting the electrical output of the converter 25 to external electrical loads and devices and, as illustrated in FIGS. 1 and 2, is susceptible of alternative embodiments. In one embodiment illustrated in FIG. 1, the output connection means 17 comprises a standard female output socket means 34, into which standard appliance plugs may be inserted.

Another embodiment of the output connection means 17, as illustrated in FIG. 2, includes a first insulated connection plug means 53 attached to the second end of the output insulated electric cable 18. This first insulated connection plug means 53 includes a multiplicity of first electrical contacts 54 which are connected to the multiplicity of conductors contained within the output electric cable 18. Insulated house plug means 56 are provided, which contains a multiplicity of second electrical contacts 55. These second electrical contacts 55 are designed to cooperate with the first electrical contacts 54 during engagement of the first insulated connection plug means 53 with the insulated house plug means 56, whereby the output of the converter 25 is supplied to the parallel power distribution system of the home by means of connecting wires 59 attached at their first end to the second electrical contacts 55 and at their second end to the parallel power distribution system of the home through attachment to structure wiring 60.

In one specific embodiment, the first insulated connection plug means comprises standard male electrical appliance plug 53, and insulated house plug means comprises home wall outlet socket 56. In this manner, the system may be attached by means of outlet socket 56 to any home for emergency use, without the need for specialized home connectors.

Figure 3:
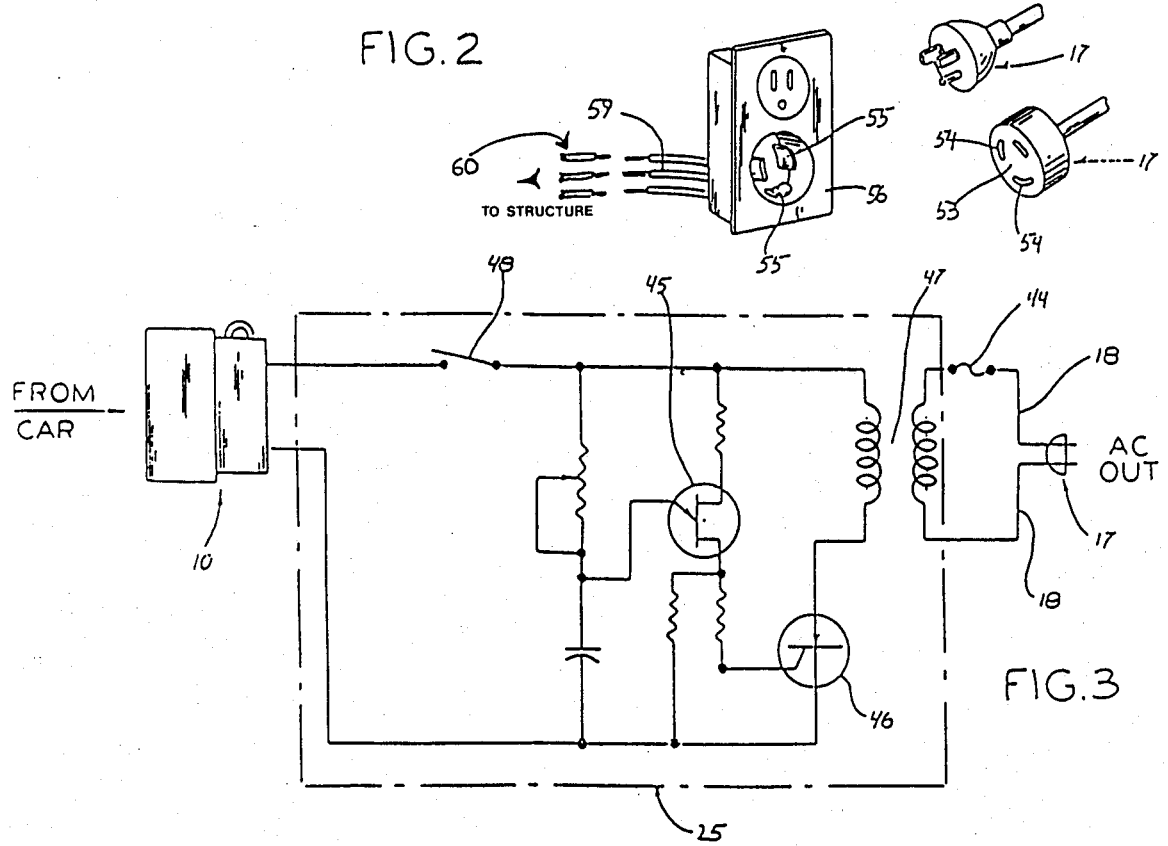
FIG. 3 of the drawings is a schematic representation of another embodiment of the converter means, namely, a relaxation oscillator circuit.

FIG. 3 illustrates one embodiment of the converter means 25, namely a relaxation oscillator converter circuit. A relaxation oscillator including a unijunction transistor 45 is utilized to repetitively trigger a silicon controlled rectifier 46, which is connected in series with the input winding of an output transformer 47. This series connection is further connected via appropriate male plug connection means 10 to an input direct current power source. Switch 48 is included in series with the input power supply to permit the supply current to be selectively applied or removed from the converter 25.

The unijunction transistor 45 operating in conjunction with the silicon controlled rectifier 46 creates a substantially square wave signal which is applied to the input primary winding of the output transformer 47, whereby a similarly alternating output of differing voltage is produced at the output winding of the transformer 47. This output is connected by the output insulated electric cable 18 to the output connection means 17 as previously described.

FIG. 3 further illustrates the inclusion of a current limiting means 44 inserted in series with one electrical conductor of the output insulated electric cable 18, which in the preferred embodiment comprises an appropriate fuse or circuit breaker designed to limit the output current to a predefined maximum, such as 20 amps.

Because of the differing electrical power requirements of certain equipment, alternative converter means 25 may be required. Such an alternative converter is illustrated in FIG. 2, and comprises an electric motor 26 mechanically coupled to an electrical generating means 27 by appropriate coupling means 28. Power to the electic motor 26 is supplied by insulated electric cable 15. The rotational mechanical output of the motor 26 is connected to the rotational input shaft of the generating means 27 by coupling means 28, which may comprise conventional speed altering transmission means, frictional or mechanical clutch means, or other connection means. In the preferred embodiment, the electric motor 26 consists of a twelve volt direct current shunt motor, and the electrical generating means 27 comprises an electrical alternator designed to output approximately 110 volt peak to peak alternating current at approximately 60 Hertz.

The foregoing description and drawings merely explain and illustrate the invention and the invention is not limited thereto, except insofar as the appended claims are so limited, as those skilled in the art having the disclosure before them will be able to make modifications and variations therein without departing from the scope of the invention.

What is claimed is:

1. A system for connecting the electrical system of an electrical source having a first electrical output, for converting said first electrical output of such source to a second electrical output of differing electrical characteristics from those of said first electrical output, and for providing said second electrical output to external electrical devices, said system comprising:
   battery access connection means for connecting the input of said system to said electrical source, said battery access connection means comprising first male plug connection means operably connected to said electrical source, said first male plug connection means including a multiplicity of male electrically conducting first prong means, said first prong means being geometrically polarized for permitting connection to cooperating female plug connection means in one orientation only;

second male plug connection means having male electrically conducting second prong means which are geometrically polarized for removable operable electrical connection with said female plug connection means and, in turn, said electrical source;

said female plug connection means further including a multiplicity of female electrically conducting socket means, said female socket means being designed to cooperate with and slidably engage said male electrically conducting first and second prong means of said respective first and second male plug connection means as well as insulating body means of suitable insulating material, said body means substantially encasing said female electrically conducting socket means, said body means further including respective apertures aligned therewithin said body means with said female electrically conducting socket means, whereby said first and second male electrically conducting prong means may pass through said apertures and slidably engage said female socket means, said female plug connection means and said insulating body means being integrated to form a single assembly in which said corresponding female electrically conducting socket means are internally electrically connected;

converter means operably and electrically integrated with said second male plug connection means and, in turn, said electrical source for converting said first electrical output of said source to said second electrical output of differing electrical characteristics;

first insulated electric cable means with a multiplicity of electrical conductors, said insulated electric cable means being attached to said second male plug connection means at said cable's first end, said multiplicity of conductors being attached to said multiplicity of male electrically conducting second prong means, and said first insulated electric cable being attached to said converter means at its second end;

output connection means for connecting said second electrical output of said converter means to external loads; and output insulated electric cable means with a multiplicity of electrical conductors, said output insulated electric cable means being attached at its first end to the output of said converter means, and attached at its second end to said output connection means.

2. The system of claim 1 wherein said first electrical output comprises approximately 12 volt direct current electrical power, and wherein said second electrical output comprises approximately 110 volt peak to peak alternating current at approximately 60 Hertz.

3. The system of claim 1 wherein said converter means comprises:
   electrical motor means;
   electrical generating means; and
   coupling means coupling the rotating output shaft of said electrical motor means to the rotatable input shaft of said electrical generating means.

4. The system of claim 3 wherein:
   said electrical motor means comprises direct current shunt motor means; and
   said electrical generating means comprises electrical alternator means.

5. The system of claim 1 wherein said converter means comprises relaxation oscillator means, said relaxation oscillator including a unijunction transistor means cooperating with silicon controlled rectifier means to produce a controllable frequency alternating current electrical signal from said first electrical source, said alternating current electrical signal being further applied to transformer means to obtain said second electrical output.

6. The system of claim 1 wherein said output connection means comprises female output socket means, said female output socket means for cooperating with standard male electrical appliance plug means.

7. The system of claim 1 wherein said output connection means comprises:
   first insulated connection plug means, said first insulated connection plug means including a multiplicity of first electrical contacts connected to said multiplicity of conductors of said insulated output electric cable;
   insulated house plug means, said house plug means including a multiplicity of second electrical contacts designed to cooperate with and electrically engage said first electrical contacts of said first insulated connection plug means, said second electrical contacts being substantially protected and insulated by the housing of said house plug means, and said house plug means being designed to cooperate with said insulated connection plug means to allow the electrical engagement of said first and second multiplicity of electrical contacts;
   said multiplicity of second electrical contacts of said insulated house plug means being connected to the parallel power distribution wiring system of a structure to provide access to and to permit the energization of said wiring system.

8. The system of claim 1 wherein said system further comprises current limiting means, said current limiting means connected to said converter means and designed to prevent said second electrical output from exceeding a predefined maximum amperage current.

* * * * *